R. D. STROUP.
CAR AND AUTOMATIC AIR BRAKE COUPLING.
APPLICATION FILED MAY 8, 1912.
1,187,938.
Patented June 20, 1916.
2 SHEETS—SHEET 1.
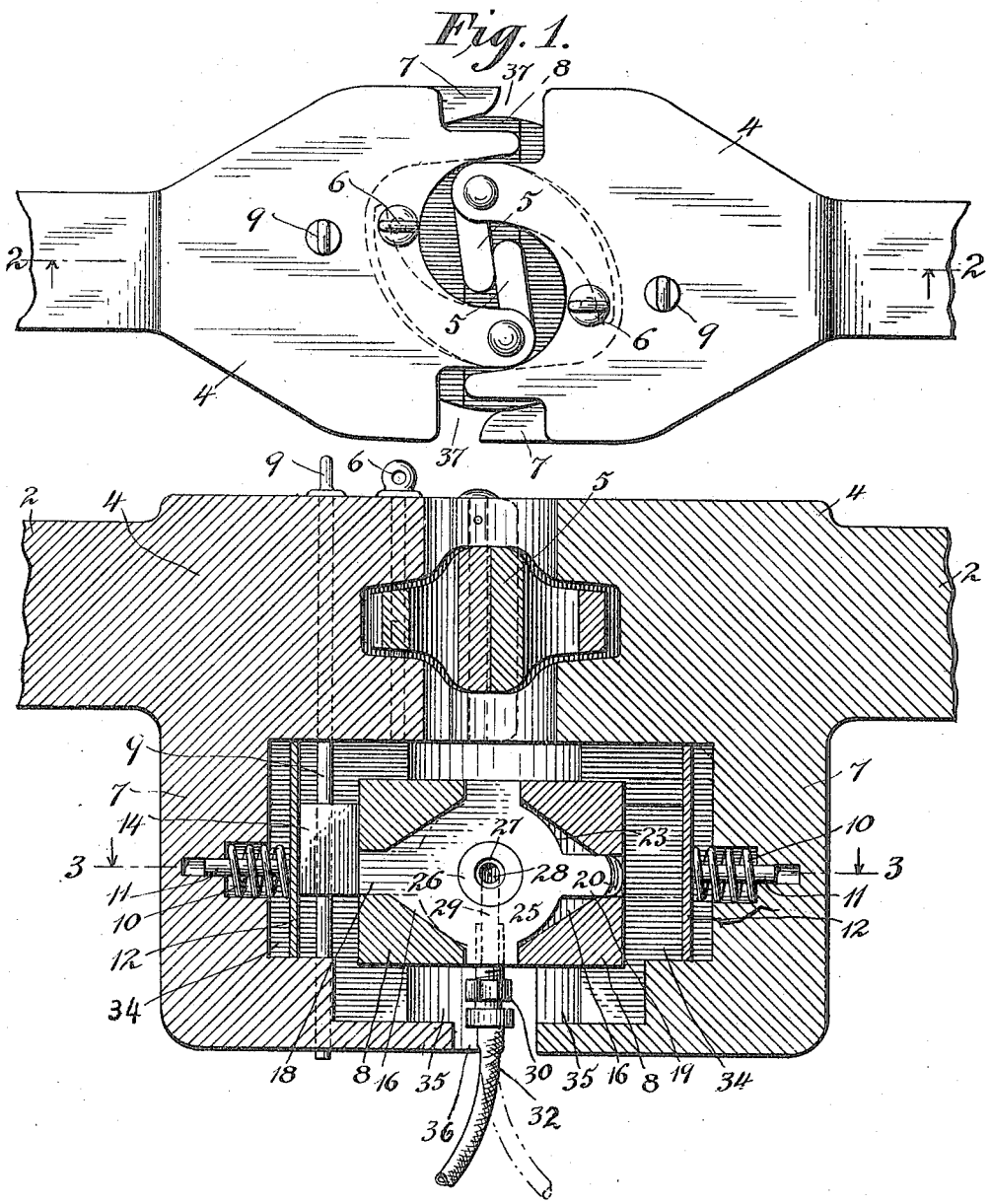

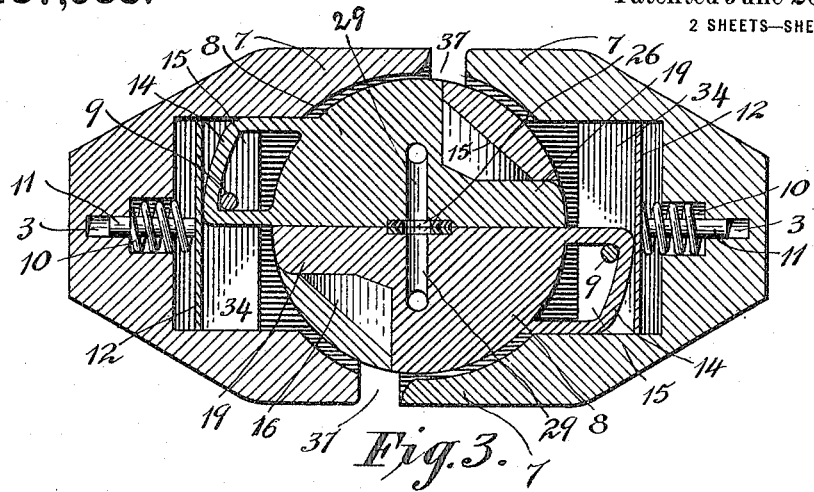
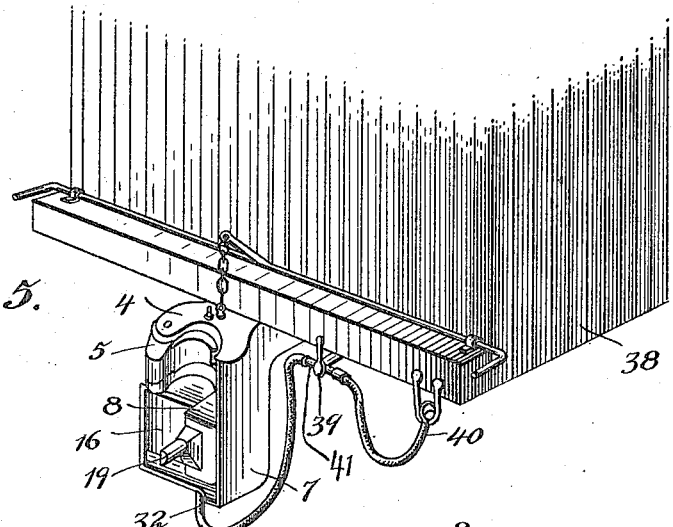
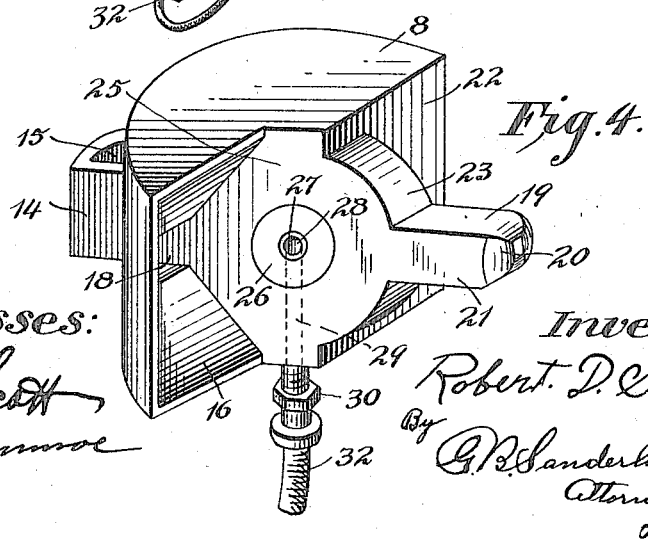

UNITED STATES PATENT OFFICE.

ROBERT D. STROUP, OF SHRYOCK, WEST VIRGINIA.

CAR AND AUTOMATIC AIR-BRAKE COUPLING.

1,187,938.     Specification of Letters Patent.     Patented June 20, 1916.

Application filed May 8, 1912. Serial No. 695,899.

*To all whom it may concern:*

Be it known that I, ROBERT D. STROUP, a citizen of the United States, residing at Shryock, in the county of Greenbrier and the State of West Virginia, have invented certain new and useful Improvements in Car and Automatic Air-Brake Couplings, of which the following is a specification.

My invention relates to an air brake coupling in combination with a car coupling in a double drawhead; and the objects of my invention are: First, to provide for the coupling and uncoupling of the air brake hose of cars by means of a hose coupling device, in combination with a car coupling, which will connect and disconnect the adjacent ends of the air brake hose automatically when the cars are coupled or uncoupled, making it unnecessary to go between the cars to couple the hose and thereby preventing accidents; second, to produce a hose coupling which will automatically adjust itself to the different heights of various cars used on railways and couple the air brake hose of cars in any position in which the cars can be coupled with a Janney type coupling; third, to make a hose coupling which will rotate in the drawhead and will not leak or break connection when cars pass over grades or turn curves; and fourth, to produce an automatic hose coupling, in combination with a car coupling which can be coupled with like couplings or any Janney type car coupling and which will not interfere with the coupling of hand-coupling hose on cars not equipped with my invention.

I attain these objects by means of the mechanism illustrated in the accompanying drawings, in which—

Figure 1 is a top plan view of a car coupling with the automatic air brake coupling; Fig. 2, a vertical section, on line 2—2 of Fig. 1, through the center of the combination drawhead of the car and automatic air brake coupling coupled to a like drawhead; Fig. 3, a central horizontal section on line 3—3 of Fig. 2 showing two automatic air brake couplings coupled, their structure and the connection of the air passages; Fig. 4, a detailed view in perspective of the rotary-block removed from the drawhead; and Fig. 5, a perspective view of the combination drawhead attached to the end of a car.

Similar numbers refer to similar parts throughout the several views.

As shown in the drawings, the draw-bar 2, the head 4, and the knuckles 5 which are held in position when the cars are coupled by the coupling pin 6, constitute the drawhead of the car coupling which, in its general structure, is similar to the couplings of the Janney type; but any similar automatic car coupling can be used. Beneath this drawhead, extending laterally and transversely therewith as well as downward, and forming an integral part thereof, is the head 7 of the automatic air brake coupling (Figs. 1 and 2). To provide for the bending of the car coupling joint when cars turn curves or pass over grades, the air brake head 7 is made shorter than the car coupling drawhead so that when coupled with a counterpart there is a space 37 between the abutting ends, and the lower part of said air brake head 7 is recessed back from front to make a passage 36 for the nipple 30 and air brake hose 32.

The air brake head 7 has a vertical semi-cylindrical chamber 35 in front which connects with a smaller rectangular recess 34 at rear, forming therewith a continuous chamber from front to rear of said head. A pin 9, entering an aperture at rear of the coupling pin 6, extends downward through the walls of the air brake head 7 and rectangular recess 34. The rear end of said recess is closed up by a movable plate 12 having a backward-projecting cylindrical peg 11 which passes through an outward-pressing spring 10 engaged by said plate and enters socket 3. The function of said plate and spring is to provide an elastic cushion which will lessen the jar during the act of coupling, and to hold the rotary-blocks tightly pressed together when coupled so as to prevent the registering air passages from leaking when the car coupling bends laterally or vertically.

The rotary-block 8 (Figs. 3 and 4), which connects the ends of the air brake hose, is a movable semi-cylindrical block with plane top and bottom, a circular rear end adapted to fit loosely in the semi-cylindrical chamber 35 of air brake head 7, and an irregular front end the left half of which forms a shoulder 22 adapted to engage the rim of the receiver 16 of a counter-part block. From this shoulder 22 projects an integral forward-directed arm 19 having a rounded point 20 and a plane side 21. The right half of said block is slightly recessed back from front and forms a funnel-shaped receiver 16 with an aperture 18 at its apex adapted to receive the forward-directed arm 19 of a counterpart block. From the circular rear end of said block projects an integral rectangular ear 14 with a large oblong aperture 15 which permits the rearward, lateral and forward movement of said block. On a vertical plane extending through center of the rotary-block from front to rear, flush with one side 21 of the forward-directed arm and rectangular ear, is the abutting face 25 which constitutes one side of the funnel-shaped receiver 16. In the center of this abutting face 25 is the orifice 28 of the downwardly-extending air passage 29 surrounded by a rubber bushing 26 flush with said abutting face and having an aperture 27 larger than the orifice which is adapted to register with the orifice of the air passage in a like rotary-block. When two rotary-blocks are coupled the bushing of one is brought into direct contact with the bushing of the other making thereby an air-tight recess around the registering orifices. The lower end of the air passage 29 terminates in a nipple 30 which is screwed into the rotary-block 8, and may be easily replaced when broken. To this nipple 30 is attached the air brake hose 32 which is connected to the T-end of the train-pipe 41.

The rotary-block 8 fits loosely and rotates laterally in the semi-cylindrical chamber 35 of the air brake head 7, and is held in position therein by the pin 9 which passes through the aperture 15 of the ear 14, and by the outward-pressing spring 10 and plate 12 which engages said ear in the rectangular recess 34. To provide for its vertical movement said block is made shorter vertically than the semi-cylindrical chamber and the rectangular recess leaving space above and below which permit it to slide up and down on the pin 9, and adjust itself to the different heights of cars, as shown in Fig. 2. When uncoupled the forward end of the rotary-block extends slightly beyond the front end of air brake head and is so disposed (Fig. 5) that when the two heads are brought together in coupling said arm 19 of each rotary-block engages the sides of the funnel-shaped receiver 16 of the other causing it to turn, ascend or descend, as the situation demands, until the arm 19 enters the aperture 18 at the apex, the shoulder 22 engages the rim of the funnel-shaped receiver 16 and the orifices 28 register simultaneously with the coupling of the cars. The rotary-blocks on each end of the cars are identical in structure and when thus coupled they form a complete air-tight cylinder (Fig. 3) held together by arm of each in the aperture 18 of the other, and adapted to rotate a quarter of a circle in the semi-cylindrical chamber. When the cars are uncoupled the pin 9, passing through the aperture 15 of the ear 14, checks the outward movement of each rotary-block, and they automatically disconnect.

Cars equipped with the car and automatic air brake coupling can be coupled with cars having like couplings, or with those having the Janney type car coupling and hand-coupling hose, as this invention does not interfere with the use of either. A T 41 having a three-way valve 39 is affixed to the end of the train pipe and the air brake coupling hose 32 is attached to one terminus of the T and the hand-coupling hose 40 to the other. By manipulating said valve the air may be turned on either hose or shut off completely, as shown by the mechanism on the end of car 38 in Fig. 5.

Having thus described my invention, what I claim and desire to secure by Letters Patent, is—

1. The combination with a suitably chambered drawhead, of a movable rotary-block semi-cylindrical in form with plane top and bottom, an irregular front end and a circular rear end, adapted to move vertically and to rotate laterally a quarter of a circle in a semi-cylindrical chamber of said drawhead.

2. In a car and automatic air brake coupling, the combination with a suitably chambered drawhead, of a semi-cylindrical block adapted to move vertically and to rotate laterally in a semi-cylindrical chamber of said drawhead, and an integral oblong ear projecting from circular rear end of said block provided with a large aperture, for purpose set forth.

3. In a car and automatic air brake coupling, the combination with a suitably chambered drawhead, of a semi-cylindrical block having an abutting face inclined to line of draft and adapted to engage the corresponding abutting face of a like block, means for permitting its vertical and lateral movement in the semi-cylindrical chamber of drawhead, and a straight forward-directed arm projecting from left half of irregular front end of said block adapted to engage the receiver and couple with a counterpart block and to hold the abutting faces of the coupled blocks in direct contact.

4. In a car and automatic air brake coupling, the combination with a suitably chambered drawhead, of a movable semi-cylindrical block having an abutting face inclined to line of draft and adapted to engage the corresponding abutting face of a like block, means for permitting its vertical and lateral movement in the semi-cylindrical chamber of drawhead, a forward-directed arm projecting from left half of irregular front end thereof, and a funnel-shaped receiver formed in right half of said block with rim slightly recessed back and provided with an aperture at its apex adapted to receive the forward-directed arm of a counterpart block.

5. In a car and automatic air brake coupling, the combination with a suitably chambered drawhead, of a semi-cylindrical block having an abutting face inclined to line of draft and adapted to be brought in direct contact with the abutting face of a like block, means for permitting its vertical and lateral movement in the semi-cylindrical chamber of drawhead, an air-passage extending in said block with a properly packed orifice in center of abutting face adapted to make an airtight joint with the orifice of the air-passage in a counterpart block when the two blocks are coupled, and a nipple screwed into said block at lower end of said air-passage adapted to connect with train-pipe hose.

6. An integral air brake head combined with a lateral plane car-coupling drawhead, extending downward therefrom and laterally therewith, with lower parts slightly recessed back to form a passage for the train-pipe hose, and provided with a vertical semi-cylindrical chamber connecting at rear with a rectangular recess and forming therewith a continuous chamber from front to rear of said head which is adapted to carry a semi-cylindrical block.

7. The combination with an air brake head, integrally united with a car-coupling drawhead and having a semi-cylindrical chamber connecting at its rear with a rectangular recess, of a movable plate adapted to fit loosely in said recess and provided with a backward-projecting peg which enters a cylindrical socket in rear of airbreak head, an outward-pressing spring which engages said plate and pushes it forward, and a pin which extends downward through drawhead, air brake head and recess therein and limits the outward-movement of said plate.

8. The combination with an air brake head, integrally connected with a car-coupling drawhead and provided with a semi-cylindrical chamber uniting at rear with a rectangular recess, of a movable plate adapted to fit loosely in said recess, a spring which engages said plate and presses it outward toward a pin extending downward through said recess, a semi-cylindrical block having an abutting face inclined to a line of draft and adapted to slide up or down in the chamber of the air brake head on pin therein which extends downward through an aperture in oblong ear on circular end of said block, an air-passage extending downward in said block with properly packed orifice in center of abutting face adapted to make an airtight joint with the orifice of air-passage in a counterpart block when the two blocks are coupled, and means for permitting lateral movement of said block in chamber of air brake head.

9. The combination with an air brake head connected with a car-coupling drawhead and provided with a vertical semi-cylindrical chamber, of a semi-cylindrical block carried in chamber of said air brake head and movable vertically and laterally relatively thereto and having an abutting face inclined to line of draft, an air-passage in said block with properly packed orifice in center of abutting face adapted to make an airtight joint with the orifice of air-passage of a counterpart block, a funnel-shaped receiver in right half of front end of said block, and a forward-directed arm projecting from left half thereof adapted to engage the receiver and couple automatically with a counterpart block in another vehicle when the two drawheads are coupled, and means for permitting rearward and forward movement of said block.

10. The combination with an air brake head connected with a lateral plane coupling drawhead and having a vertical semi-cylindrical chamber united at rear with rectangular recess, of a semi-cylindrical block carried by said air brake head movable laterally and vertically relatively thereto and having an abutting face inclined to line of draft, an air-passage in said block with properly packed orifice in center of abutting face adapted to make an airtight joint with the orifice of air-passage in counterpart block, a nipple screwed into said block at lower end of said air-passage adapted to connect with train-pipe hose at recessed lower end of air brake head, an integral oblong ear projecting from circular rear end of semi-cylindrical block with large aperture which fits loosely around a pin extending downward through the drawhead and permits limited rearward lateral and forward movement of said block, a movable plate which fits in recess of air brake head, and a spring which presses said plate forward against oblong ear of semi-cylindrical block forcing it forward and permitting it to move rearward when pressure is brought against front end by a counterpart block during act of coupling.

In testimony whereof I have hereunto affixed my signature in the presence of two witnesses.

ROBERT D. STROUP.

Witnesses:
H. E. CRICKENBERGER,
C. R. HENTON.

Copies of this patent may be obtained for five cents each, by addressing the "Commissioner of Patents, Washington, D. C."